US012691814B2

(12) United States Patent
Kihara

(10) Patent No.: US 12,691,814 B2
(45) Date of Patent: Jul. 28, 2026

(54) LIGHT DISTRIBUTION CONTROLLING DEVICE, VEHICLE LAMP SYSTEM, AND LIGHT DISTRIBUTION CONTROLLING METHOD

(71) Applicant: Koito Manufacturing Co., Ltd., Tokyo (JP)

(72) Inventor: Satoshi Kihara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 149 days.

(21) Appl. No.: 18/819,351

(22) Filed: Aug. 29, 2024

(65) Prior Publication Data

US 2024/0416824 A1 Dec. 19, 2024

Related U.S. Application Data

(63) Continuation of application No. PCT/JP2023/007654, filed on Mar. 1, 2023.

(30) Foreign Application Priority Data

Mar. 15, 2022 (JP) ................................. 2022-040366

(51) Int. Cl.
*B60Q 1/14* (2006.01)
*B60Q 1/00* (2006.01)

(52) U.S. Cl.
CPC .............. *B60Q 1/14* (2013.01); *B60Q 1/0023* (2013.01); *B60Q 2300/112* (2013.01); *B60Q 2300/122* (2013.01)

(58) Field of Classification Search
CPC .............. B60R 2001/1253; B60R 11/04; B60R 2001/1223; B60R 1/04; B60R 21/0152;
(Continued)

(56) References Cited

U.S. PATENT DOCUMENTS

2015/0085514 A1 3/2015 Yagi
2020/0130562 A1* 4/2020 Sung ....................... F21S 41/60
(Continued)

FOREIGN PATENT DOCUMENTS

DE 102017001893 A1 8/2018
EP 3187369 A1 7/2017
(Continued)

OTHER PUBLICATIONS

International Preliminary Report on Patentability (Form PCT/IB/373) and the Written Opinion of the International Searching Authority (Form PCT/ISA/237) issued on Sep. 10, 2024, by the International Bureau of WIPO in corresponding International Application No. PCT/JP2023/007654. (8 pages).
(Continued)

*Primary Examiner* — Monica C King
(74) *Attorney, Agent, or Firm* — BUCHANAN, INGERSOLL & ROONEY PC

(57) ABSTRACT

A light distribution controlling device determines a light distribution pattern having a dimmed portion to overlap a dimming target present in a region ahead of a vehicle. The light distribution controlling device performs, by using a structuring element of a predetermined shape, a dilation process on a luminous point included in an image capturing the region ahead to generate a dilated region, and determines the dimmed portion based on the dilated region. The light distribution controlling device varies at least one of a size of the structuring element or a position of a pixel of interest in the structuring element in accordance with at least one of a vehicle speed or a rate of turn of the vehicle.

10 Claims, 6 Drawing Sheets

(58) Field of Classification Search
CPC . B60R 25/25; B60R 25/257; B60R 21/01534; B60R 21/01536; B60R 21/0153; B60R 21/01542; B60R 21/01552; B60R 21/01538; B60R 25/00; B60R 25/1004; B60R 21/01516; B60R 1/12; B60R 25/01; B60R 25/102; B60R 25/20; B60R 25/2081; B60R 1/088; B60R 1/089; B60R 16/037; B60R 2011/0033; B60R 2001/1215; B60R 2001/1284; B60R 2021/0027; B60R 2021/01315; B60R 21/0134; B60R 21/01544; B60R 21/01548; B60R 21/01554; B60R 25/255; B60R 21/013; B60R 21/0136; B60R 21/01532; B60R 21/203; B60R 25/252; B60R 2011/0005; B60R 16/0231; B60R 2021/01225; B60R 2021/23153; B60R 2021/26094; B60R 2021/2765; B60R 2022/208; B60R 2022/288; B60R 2022/4685; B60R 2022/4825; B60R 21/0132; B60R 21/015; B60R 21/01546; B60R 21/21656; B60R 21/276; B60R 22/20; B60R 22/201; G06V 10/82; G06V 20/59; G06V 20/56; G06V 20/58; G06V 40/28; G06V 10/764; G06V 20/593; G06V 20/584; G06V 20/588; G06V 40/172; G06V 40/15; G06V 40/166; G06V 40/168; G06V 40/10; G06V 40/16; G06V 40/20; G06V 10/147; G06V 10/26; G06V 10/454; G06V 10/774; G06V 20/647; G06V 10/141; G06V 10/56; G06V 10/143; G06V 10/25; G06V 10/30; G06V 10/7747; G06V 20/00; G06V 20/695; G06V 40/107; G06V 40/11; G06V 40/113; G06V 10/46; G06V 10/50; G06V 10/52; G06V 10/763; G06V 20/586; G06V 30/1902; G06V 10/16; G06V 10/471; G06V 10/757; G06V 10/7715; G06V 10/806; G06V 10/955; G06V 20/582; G06V 10/225; G06V 10/255; G06V 10/267; G06V 10/34; G06V 10/422; G06V 10/44; G06V 10/462; G06V 10/60; G06V 10/766; G06V 10/80; G06V 10/84; G06V 20/597; G06V 20/64; G06V 2201/07; G06V 2201/08; G06V 30/19173; G06V 30/274; G06V 40/103; G06V 40/174; G06V 40/18
See application file for complete search history.

(56) References Cited

U.S. PATENT DOCUMENTS

| | | | |
|---|---|---|---|
| 2022/0227285 A1 | 7/2022 | Arai et al. | |
| 2022/0412530 A1 | 12/2022 | Mimoun | |
| 2023/0202382 A1 | 6/2023 | Maruyama | |
| 2024/0046409 A1* | 2/2024 | An | G06N 3/08 |

FOREIGN PATENT DOCUMENTS

| | | | |
|---|---|---|---|
| FR | 3099541 A1 | 2/2021 | |
| JP | 2015064964 A | 4/2015 | |
| JP | 2016027977 A | 2/2016 | |
| WO | 2021070783 A1 | 4/2021 | |
| WO | 2021/200803 A1 | 10/2021 | |

OTHER PUBLICATIONS

International Search Report (Form PCT/ISA/210) issued on May 23, 2023, by the Japanese Patent Office in corresponding International Application No. PCT/JP2023/007654. (5 pages).
Extended European Search Report issued on May 7, 2025, in corresponding European Patent Application No. 23770418.4. (9 pages).

* cited by examiner

LIGHT DISTRIBUTION CONTROLLING DEVICE, VEHICLE LAMP SYSTEM, AND LIGHT DISTRIBUTION CONTROLLING METHOD

CROSS-REFERENCE TO RELATED APPLICATIONS

This application is the continuation of International Patent Application No. PCT/JP2023/007654, filed on Mar. 1, 2023, which claims the benefit of priority from Japanese Patent Application No. 2022-040366, filed on Mar. 15, 2022, the entire content of each of which is incorporated herein by reference.

BACKGROUND

Field of the Invention

The present invention relates to light distribution controlling devices, vehicle lamp systems, and light distribution controlling methods.

Description of the Related Art

Adaptive driving beam (ADB) control is being proposed that dynamically and adaptively controls light distribution patterns based on the circumstances surrounding the vehicle. ADB control detects, with a camera, the presence of a dimming target that should not be illuminated with high-luminance light and dims the region that corresponds to the dimming target (see, for example, Patent Literature 1). Examples of such dimming targets include front vehicles, including leading vehicles and oncoming vehicles. Dimming the region corresponding to a front vehicle can reduce glare caused on the driver of the front vehicle and can also improve the visibility for the driver of the host vehicle.

Other examples of dimming targets include light reflective objects, including road signs, delineators, and signboards. Vehicle lamps nowadays are more luminous, and light reflected by light reflective objects tends to be more intense. Therefore, high-luminance light may be reflected from light reflective objects, and such light may cause glare on the driver of the host vehicle. Accordingly, light reflective objects, too, are important dimming targets.
Patent Literature 1: JP 2015-064964

In implementing ADB control, a dimmed portion of a light distribution pattern should desirably overlap a dimming target with high accuracy.

SUMMARY OF THE INVENTION

The present invention has been made in view of such circumstances and is directed, in one aspect, to providing a technology that reduces mispositioning of a dimmed portion of a light distribution pattern relative to a dimming target.

To solve the problem above, one aspect of the present invention provides a light distribution controlling device that determines a light distribution pattern having a dimmed portion to overlap a dimming target present in a region ahead of a vehicle. This light distribution controlling device performs, by using a structuring element of a predetermined shape, a dilation process on a luminous point included in an image capturing the region ahead to generate a dilated region, and determines the dimmed portion based on the dilated region; and varies at least one of a size of the structuring element or a position of a pixel of interest in the structuring element in accordance with at least one of a vehicle speed or a rate of turn of the vehicle.

Another aspect of the present invention provides a vehicle lamp system. This vehicle lamp system includes a light distribution variable lamp capable of illuminating a region ahead of a vehicle with a visible light beam of a variable intensity distribution; an imaging device that captures an image of the region ahead; and the light distribution controlling device according to the aspect above that determines a light distribution pattern based on the image captured by the imaging device and controls the light distribution variable lamp so as to form the light distribution pattern.

Another aspect of the present invention provides a light distribution controlling method of determining a light distribution pattern having a dimmed portion to overlap a dimming target present in a region ahead of a vehicle. This light distribution controlling method includes performing, by using a structuring element of a predetermined shape, a dilation process on a luminous point included in an image capturing the region ahead to generate a dilated region, and determining the dimmed portion based on the dilated region; and varying at least one of a size of the structuring element or a position of a pixel of interest in the structuring element in accordance with at least one of a vehicle speed or a rate of turn of the vehicle.

It is to be noted that any combinations of the constituent elements above or an embodiment obtained by converting what is expressed by the present invention between a method, an apparatus, a system, and so forth is also valid as an aspect of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
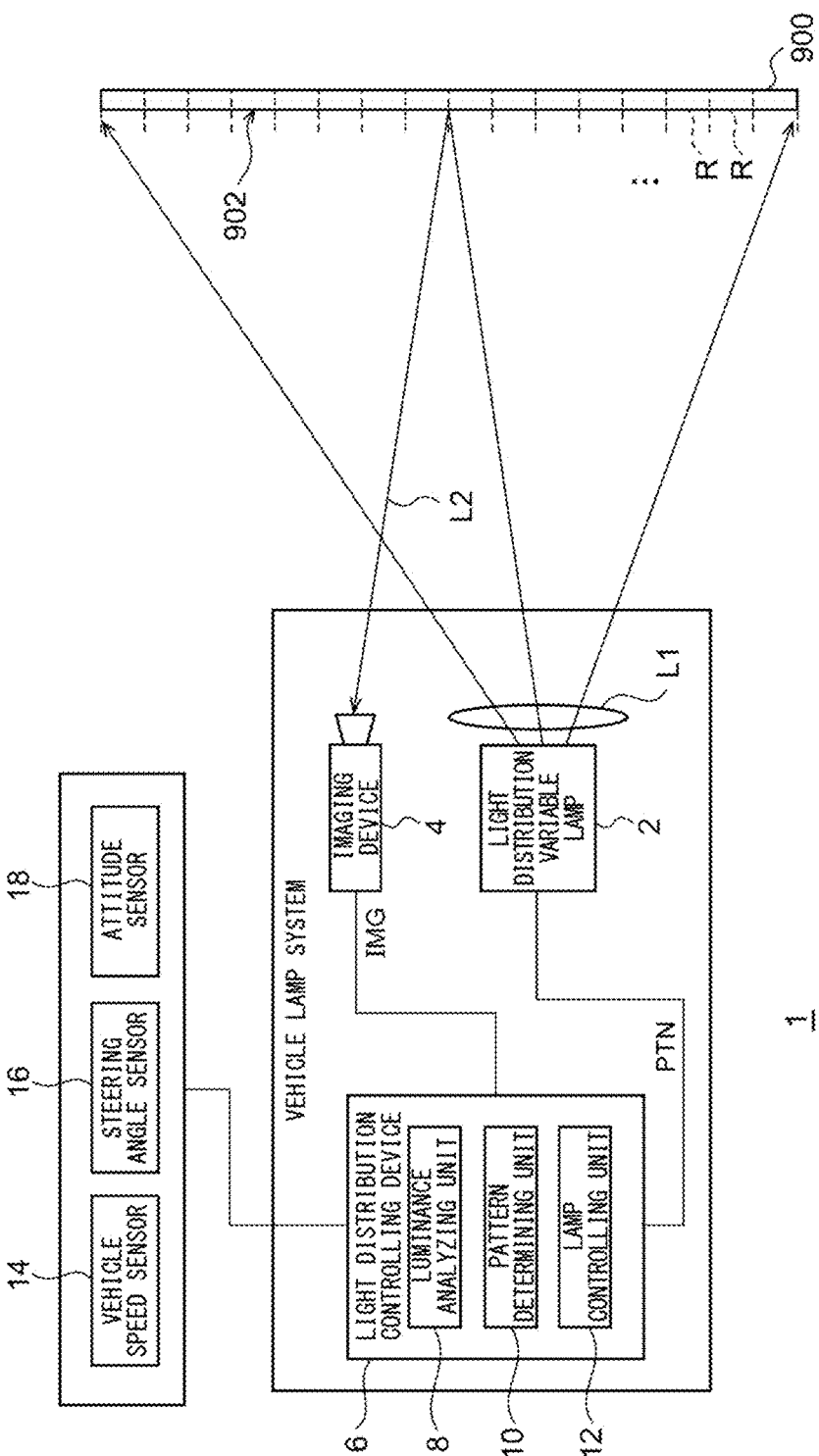
FIG. 1 is a block diagram of a vehicle lamp system.

Hereinafter, the present invention will be described based on some exemplary embodiments with reference to the drawings. The embodiments are illustrative in nature and are not intended to limit the invention. Not all the features and combinations thereof described of the embodiments are necessarily essential to the invention. Identical or equivalent constituent elements, members, and processes illustrated in the drawings are given identical reference characters, and their duplicate description will be omitted as appropriate.

The scales and shapes of the components illustrated in the drawings are set merely for convenience in order to facilitate the description and are not to be interpreted as limiting, unless specifically indicated otherwise. When terms such as "first" and "second" are used in the present specification or in the claims, these terms do not indicate the order or the level of importance in any way and are merely used to distinguish a given component from another component, unless specifically indicated otherwise. Part of a member that is not important in describing the embodiments is omitted from the drawings.

FIG. 1 is a block diagram of a vehicle lamp system 1. FIG. 1 depicts constituent elements of the vehicle lamp system 1 in the form of functional blocks. These functional blocks are implemented, in terms of their hardware configuration, by elements and/or circuits, such as a CPU and a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, an imaging device 4, and a light distribution controlling device 6. These members may be contained within a single housing, or one or more of these members may be provided outside such a housing. For example, the light distribution variable lamp 2, the imaging device 4, and the light distribution controlling device 6 are housed in a lamp room. The lamp room is defined by a lamp body having an opening that opens to the front of the vehicle, and a light-transmissive cover attached to cover the opening of the lamp body. The imaging device 4 and the light distribution controlling device 6 may be provided outside the lamp room, such as in the vehicle. In this case, the imaging device 4 may be an onboard camera. The light distribution controlling device 6 may be entirely or partly constituted by a vehicle ECU.

The light distribution variable lamp 2 is capable of illuminating a region ahead of the host vehicle with a visible light beam L1 of a variable intensity distribution. The light distribution variable lamp 2 is enabled to vary, independently of each other, the illuminance of light in a plurality of illuminated individual regions R arrayed ahead of the vehicle. The plurality of individual regions R are arrayed, for example, in a matrix. The light distribution variable lamp 2 receives information instructing on a light distribution pattern PTN from the light distribution controlling device 6 and emits a visible light beam L1 having an intensity distribution corresponding to the light distribution pattern PTN. Thus, the light distribution pattern PTN is formed ahead of the host vehicle. A light distribution pattern PTN is understood as a two-dimensional illuminance distribution of an illumination pattern 902 that the light distribution variable lamp 2 forms on an imaginary vertical screen 900 ahead of the host vehicle.

There is no particular limitation on the configuration of the light distribution variable lamp 2, and the light distribution variable lamp 2 includes, for example, a plurality of light sources arrayed in a matrix and a lighting circuit that drives the light sources to turn them on independently of each other. Some preferred examples of such a light source include a semiconductor light source, such as a light-emitting diode (LED), a laser diode (LD), or an organic or inorganic electroluminescence (EL) light source. The light sources are mapped to the respective individual regions R, and each individual region R is individually illuminated with light from the corresponding light source. The light distribution variable lamp 2 has a resolution, that is, a light distribution resolving power of, for example, from 1,000 pixels to 2,000,000 pixels. The resolution of the light distribution variable lamp 2 means the number of the unit regions, of a light distribution pattern PTN, whose illuminance can be varied independently of each other.

In order to form an illuminance distribution corresponding to a light distribution pattern PTN, the light distribution variable lamp 2 may include, for example but not limited to, a pattern forming device of a matrix type, such as a digital mirror device (DMD) or a liquid-crystal device, or a pattern forming device of a scan optics type that scans the region ahead of the host vehicle with light from the light sources.

The imaging device 4 has a sensitivity to a visible light range and repeatedly captures an image of the region ahead of the host vehicle. The imaging device 4 captures an image of reflected light L2 of a visible light beam L1 reflected by an object ahead of the vehicle. The imaging device 4 also captures an image of light from a front vehicle, which includes a leading vehicle and an oncoming vehicle. An image IMG that the imaging device 4 has generated is sent to the light distribution controlling device 6.

An image IMG that the light distribution controlling device 6 acquires from the imaging device 4 may be RAW image data or image data subjected to predetermined image processing by the imaging device 4. When the light distribution controlling device 6 receives image data resulting from subjecting RAW image data generated by the imaging device 4 to image processing performed by a processing device other than the imaging device 4, this receiving also corresponds to the acquiring of an image IMG from the imaging device 4. In the following description, "an image IMG capturing a region ahead" or "an image IMG captured by an imaging device 4" may mean either of RAW image data and data subjected to image processing. Furthermore, the expression "image IMG" may be used without any distinction between the two types of image data.

The light distribution controlling device 6 executes ADB control of dynamically and adaptively controlling the light distribution of the light distribution variable lamp 2 in accordance with a target present in the region ahead. The light distribution controlling device 6 according to the present embodiment determines a light distribution pattern PTN having a dimmed portion to overlap a dimming target present in the region ahead of the vehicle, based on an image IMG captured by the imaging device 4. The light distribution controlling device 6 then controls the light distribution variable lamp 2 so as to form the determined light distribution pattern PTN.

The light distribution controlling device 6 can be constituted by a digital processor and may, for example, be constituted by a combination of a microcomputer including a CPU and a software program or by a field-programmable gate array (FPGA), an application specific IC (ASIC), or the like. The light distribution controlling device 6 according to the present embodiment includes, in one example, a luminance analyzing unit 8, a pattern determining unit 10, and a lamp controlling unit 12. Each of these units operates as an integrated circuit constituting itself executes a program stored in a memory.

The luminance analyzing unit 8 subjects an image IMG captured by the imaging device 4 to known image processing, such as binarization, and thus generates a luminous point image extracting a luminous point derived from a dimming target. A luminous point image may include, for example, a pair of luminous points corresponding to lamps of a front vehicle or a luminous point corresponding to a light reflective object. Lamps of a front vehicle are, for example, rear lamps if the front vehicle is a leading vehicle or are, for example, headlamps if the front vehicle is an oncoming vehicle. A rear lamp includes a stop lamp and a tail lamp. A light reflective object is, for example, at least one selected from the group consisting of a road sign, a delineator, and a signboard. A light reflective object may also be an object having a retroreflective surface located in its part that is visible at least from the host vehicle. The luminance analyzing unit 8 sends a luminous point image to the pattern determining unit 10 as an analysis result.

The pattern determining unit 10 determines a light distribution pattern PTN based on an analysis result of the luminance analyzing unit 8. First, the pattern determining unit 10, by using a structuring element of a predetermined shape, performs a dilation process on a luminous point included in an image IMG (luminous point image in the present embodiment) capturing the region ahead. Through this process, the pixel values of pixels around the luminous point are changed to the pixel value of the luminous point, and a high-luminance dilated region is generated in the luminous point image. Then, the pattern determining unit 10 determines a dimmed portion based on the generated dilated region. For example, the pattern determining unit 10 adopts the shape of the dilated region as the shape of the dimmed portion. Furthermore, the pattern determining unit 10 sets the illuminance of the dimmed portion to a value lower than the illuminance of the region other than the dimmed portion. For example, the pattern determining unit 10 sets the illuminance of a dimmed portion corresponding to a dilated region derived from a front vehicle to zero. Meanwhile, the pattern determining unit 10 sets the illuminance of a dimmed portion corresponding to a dilated region derived from a light reflective object to higher than zero.

The pattern determining unit 10 can determine whether a luminous point and, in turn, a dilated region has been derived from a front vehicle or from a light reflective object based, for example, on the position of the luminous point in the image IMG or the presence of pairedness. Pairedness of luminous points means that a plurality of luminous points behave in the same manner while maintaining their distance. Through the process described above, a light distribution pattern PTN that includes a dimmed portion corresponding to a front vehicle or a light reflective object is determined. The pattern determining unit 10 sends information about the light distribution pattern PTN to the lamp controlling unit 12.

The lamp controlling unit 12 instructs the light distribution variable lamp 2 to form the light distribution pattern PTN. The lamp controlling unit 12 is constituted, for example, by a known LED driver module (LDM). If the light sources of the light distribution variable lamp 2 are controlled through analog dimming, the lamp controlling unit 12 adjusts the direct current level of the driving current flowing in the light sources. Meanwhile, if the light sources are controlled through pulse width modulation (PWM) dimming, the lamp controlling unit 12 adjusts the mean level of the driving current by switching the current that flows in the light sources to adjust the ratio of the on-periods. If the light distribution variable lamp 2 includes a DMD, the lamp controlling unit 12 may control the on/off switching of each mirror device constituting the DMD. If the lamp controlling unit 12 includes a liquid-crystal device, the lamp controlling unit 12 may control the optical transmittance of the liquid-crystal device. Thus, the light distribution pattern PTN is formed ahead of the host vehicle.

In the light distribution control described above, there may be a case in which the latency or the like in each process produces a mismatch between the position of a dimming target in an image IMG and the actual position where the dimming target is present at the time of projecting a light distribution pattern PTN. In particular, in a situation in which the amount of change, per unit time, in the relative position of the host vehicle and a dimming target tends to be large, such as when the host vehicle is traveling at high speed or is turning, the actual position of a dimming target tends to fail to match the position of the dimming target in an image IMG.

When the actual position of a dimming target fails to match the position of the dimming target in an image IMG, the dimmed portion in the light distribution pattern PTN may become mispositioned relative to the dimming target, and that may cause glare on the driver of the host vehicle or of the front vehicle. Accordingly, the light distribution controlling device 6 according to the present embodiment executes control of changing the condition for setting a dimmed portion in accordance with the state of the host vehicle.

Specifically, the pattern determining unit 10 varies at least one of the size of a structuring element used to set a dimmed portion or the position of a pixel of interest in a structuring element, in accordance with at least one of the vehicle speed or the rate of turn of the host vehicle. The vehicle speed of the host vehicle can be acquired based on a detection value of a vehicle speed sensor 14 provided in the vehicle. In this case, the pattern determining unit 10 can be understood to be adjusting a structuring element 20 in accordance with an output of the vehicle speed sensor 14.

The rate of turn of the host vehicle, that is, the angle by which to turn per unit time (yaw rate) can be acquired based on a detection value of a steering angle sensor 16 (steering sensor) provided in the vehicle. In this case, the pattern determining unit 10 can be understood to be adjusting a structuring element 20 in accordance with an output of the steering angle sensor 16. Typically, a vehicle is provided with a steering angle sensor 16. Therefore, using a steering angle sensor 16 can curb the cost for implementing light distribution control by the light distribution controlling device 6.

If the vehicle is provided with an attitude sensor 18, such as a gyro sensor, the rate of turn can be acquired based on a detection value of the attitude sensor 18. In this case, the pattern determining unit 10 can be understood to be adjusting a structuring element 20 in accordance with an output of the attitude sensor 18. Herein, the attitude sensor 18 is provided preferably in the lamp room. Then, the attitude sensor 18 can send its detection value to the pattern determining unit 10 without involving CAN communication. This configuration can improve the responsiveness of light distribution control.

[Control in Accordance with Vehicle Speed]

Figure 2:
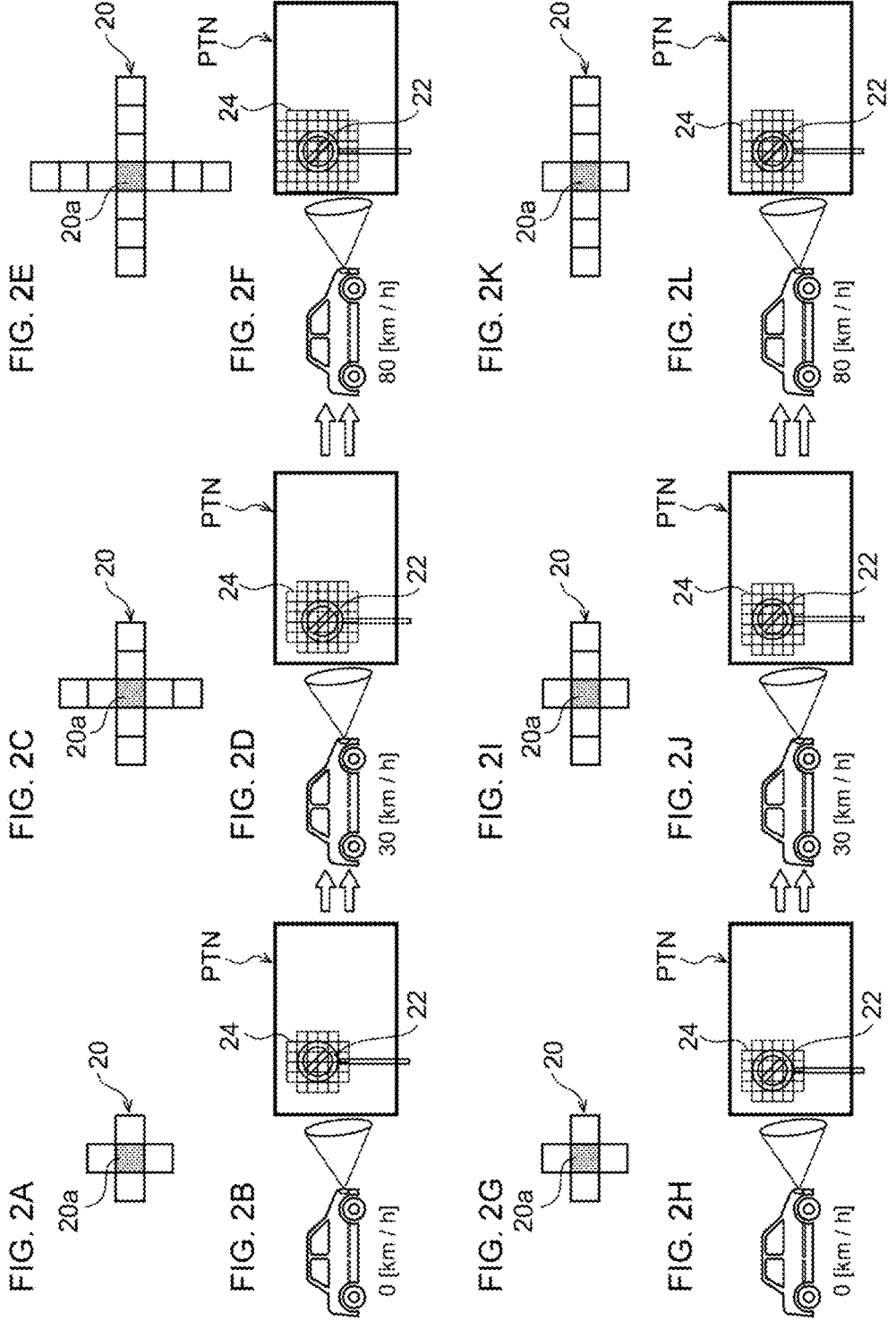
FIGS. 2A to 2L are schematic diagrams for describing control of varying the size of a structuring element in accordance with a vehicle speed.

FIGS. 2A to 2L are schematic diagrams for describing control of varying the size of a structuring element in accordance with a vehicle speed. In one example of this control, the pattern determining unit 10 stores therein a structuring element 20 (kernel) of a predetermined shape set in advance as shown in FIG. 2A. The structuring element 20 in one example is cross-shaped and is used, for example, when the vehicle speed of the host vehicle is 0 km/h.

The pattern determining unit 10 performs a dilation process on a luminous point image with the center pixel of the structuring element 20 mapped to a pixel of interest 20a, that is, with this center pixel set as an anchor to overlap a pixel of interest 20a. In the dilation process, when any of the pixels that the structuring element 20 overlaps is a pixel of a high pixel value, the pixel value of the pixel of interest 20a is changed to this high pixel value. As a result, a light distribution pattern PTN having a dimmed portion 24 to overlap a dimming target 22 is determined, as shown in FIG. 2B.

When the vehicle speed is higher than 0 km/h and is, for example, 30 km/h, the pattern determining unit 10 sets the dimensions of the structuring element 20 in the image's up-down and right-left directions to dimensions greater than the dimensions used when the vehicle speed is 0 km/h, as shown in FIG. 2C. Thus, a light distribution pattern PTN having a dimmed portion 24 that is larger in the up-down and right-left directions than the one set when the vehicle speed is 0 km/h is determined, as shown in FIG. 2D.

When the vehicle speed is higher than 30 km/h and is, for example, 80 km/h, the pattern determining unit 10 sets the dimensions of the structuring element 20 in the image's up-down and right-left directions to dimensions greater than the dimensions used when the vehicle speed is 30 km/h, as shown in FIG. 2E. Thus, a light distribution pattern PTN having a dimmed portion 24 that is larger in the up-down and right-left directions than the one set when the vehicle speed is 30 km/h is determined, as shown in FIG. 2F.

In this manner, as, when the vehicle speed is a second vehicle speed higher than a first vehicle speed, the dimensions of the structuring element 20 in the image's up-down and right-left directions are set greater than the dimensions in the image's up-down and right-left directions held when the vehicle speed is the first vehicle speed, the size of a dimmed portion 24 can be increased in the up-down and right-left directions in accordance with an increase in the vehicle speed. This configuration can reduce mispositioning of a dimmed portion 24 relative to a dimming target 22 even in a situation in which a change in the relative position of the host vehicle and the dimming target 22 is large.

Herein, FIGS. 2A, 2C, and 2E show the structuring element 20 schematically. Therefore, the number of the pixels extending up and down and right and left from the center pixel of the structuring element 20, for example, is not limited to those illustrated. For example, the structuring element 20 used when the vehicle speed is 0 km/h may be linear, extending right and left from the center pixel. The vehicle speeds 0 km/h, 30 km/h, and 80 km/h are examples, and a structuring element 20 of which shape to use at which vehicle speed can be set as appropriate. It suffices that the size of a structuring element 20 vary at least between two levels, and the size may vary between multiple levels of three or more levels or may vary smoothly (continuously).

In another example of control of varying the size of a structuring element in accordance with a vehicle speed, the pattern determining unit 10 stores in advance a structuring element 20 having a predetermined shape as shown in FIG. 2G. The structuring element 20 in one example is cross-shaped and is used, for example, when the vehicle speed of the host vehicle is 0 km/h. The pattern determining unit 10 performs a dilation process on a luminous point image with the center pixel of the structuring element 20, serving as an anchor, mapped to a pixel of interest 20a. As a result, a light distribution pattern PTN having a dimmed portion 24 to overlap a dimming target 22 is determined, as shown in FIG. 2H.

When the vehicle speed is higher than 0 km/h and is, for example, 30 km/h, the pattern determining unit 10 sets the dimensions of the structuring element 20 in the image's right-left directions to dimensions greater than the dimensions used when the vehicle speed is 0 km/h, as shown in FIG. 2I. Thus, a light distribution pattern PTN having a dimmed portion 24 that is larger in the right-left directions than the one set when the vehicle speed is 0 km/h is determined, as shown in FIG. 2J.

When the vehicle speed is higher than 30 km/h and is, for example, 80 km/h, the pattern determining unit 10 sets the dimensions of the structuring element 20 in the image's right-left directions to dimensions greater than the dimensions used when the vehicle speed is 30 km/h, as shown in FIG. 2K. Thus, a light distribution pattern PTN having a dimmed portion 24 that is larger in the right-left directions than the one set when the vehicle speed is 30 km/h is determined, as shown in FIG. 2L.

In this manner, as, when the vehicle speed is a second vehicle speed higher than a first vehicle speed, the dimensions of the structuring element 20 in the image's right-left directions are set greater than the dimensions in the image's right-left directions held when the vehicle speed is the first vehicle speed, the size of a dimmed portion 24 can be increased in the right-left directions in accordance with an increase in the vehicle speed. This configuration can reduce mispositioning of a dimmed portion 24 relative to a dimming target 22 even in a situation in which a change in the relative position of the host vehicle and the dimming target 22 is large.

Herein, FIGS. 2G, 2I, and 2K show the structuring element 20 schematically. Therefore, the number of the pixels extending up and down and right and left from the center pixel of the structuring element 20, for example, is not limited to those illustrated. For example, the structuring element 20 may be linear, extending right and left from the center pixel. The vehicle speeds 0 km/h, 30 km/h, and 80 km/h are examples, and a structuring element 20 of which shape to use at which vehicle speed can be set as appropriate. It suffices that the size of a structuring element 20 vary at least between two levels, and the size may vary between multiple levels of three or more levels or may vary smoothly.

Figure 3:
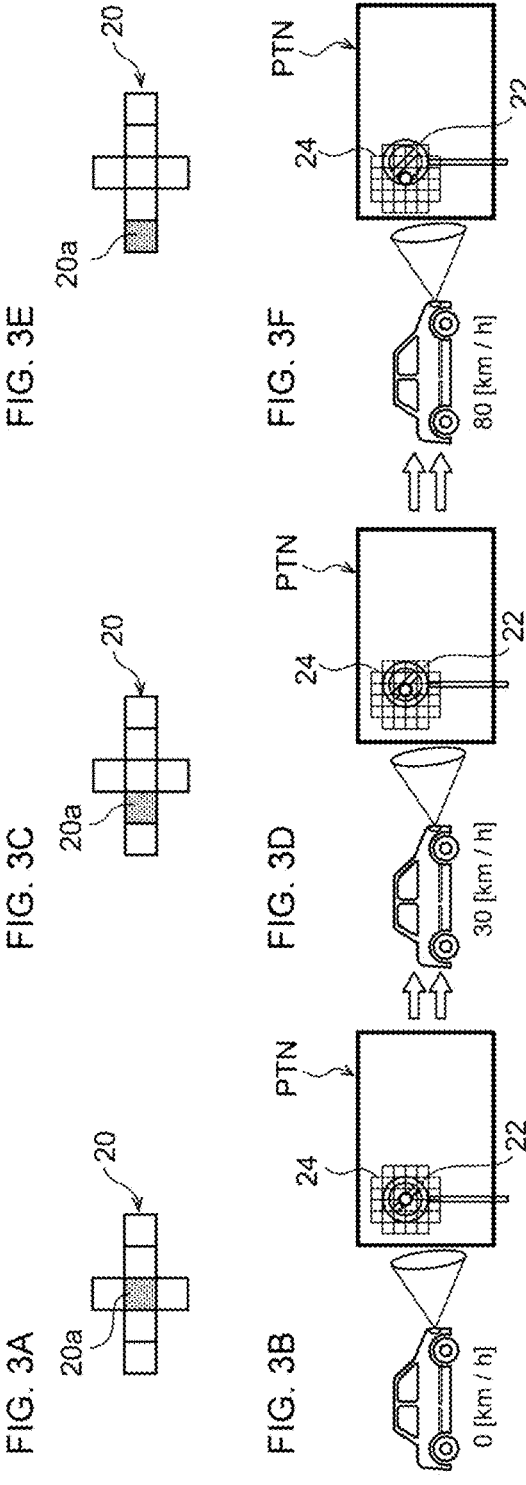
FIGS. 3A to 3F are schematic diagrams for describing control of varying the position of a pixel of interest in a structuring element in accordance with a vehicle speed.

FIGS. 3A to 3F are schematic diagrams for describing control of varying the position of a pixel of interest 20a in a structuring element 20 in accordance with a vehicle speed. In one example of this control, the pattern determining unit 10 stores therein a structuring element 20 of a predetermined shape set in advance as shown in FIG. 3A. The structuring element 20 in one example is cross-shaped and is used, for example, when the vehicle speed of the host vehicle is 0 km/h. The pattern determining unit 10 performs a dilation process on a luminous point image with the center pixel of the structuring element 20, serving as an anchor, mapped to a pixel of interest 20a. As a result, a light distribution pattern PTN having a dimmed portion 24 to overlap a dimming target 22 is determined, as shown in FIG. 3B.

When the vehicle speed is higher than 0 km/h and is, for example, 30 km/h, the pattern determining unit 10 shifts the position of the pixel of interest 20a in the structuring element 20, that is, the position of the anchor in the structuring element 20 from the position used when the vehicle speed is 0 km/h in the direction in which a dimming target 22 is displaced due to the movement of the host vehicle, as shown in FIG. 3C. When the anchor position of the structuring element 20 is shifted, a high-luminance pixel derived from a luminous point can be dilated in the direction in which the anchor has been shifted. Thus, a light distribution pattern PTN having a dimmed portion 24 shifted from the position held when the vehicle speed is 0 km/h in the direction in which a dimming target 22 is displaced is determined, as shown in FIG. 3D.

For example, when the traveling lane of the host vehicle is linear, the direction in which a dimming target 22 is displaced is the left direction if the dimming target 22 is located to the left of the traveling lane or is the right direction if the dimming target 22 is located to the right of the traveling lane. The pattern determining unit 10 can find the direction in which a dimming target 22 is displaced, with the use of conventionally known techniques, including algorithm recognition or deep learning. The pattern determining unit 10 may determine the direction in which a dimming target 22 is displaced, based solely on the position of a luminous point in an image IMG. For example, the pattern determining unit 10 determines that a dimming target 22 forming a luminous point is displaced to the right when the luminous point is in the right half of an image IMG or determines that a dimming target 22 forming a luminous point is displaced to the left when the luminous point is in the left half of an image IMG.

When the vehicle speed is higher than 30 km/h and is, for example, 80 km/h, the pattern determining unit 10 shifts the position of the pixel of interest 20a in the structuring element 20 from the position used when the vehicle speed is 30 km/h in the direction in which a dimming target 22 is displaced, as shown in FIG. 3E. Thus, a light distribution pattern PTN having a dimmed portion 24 shifted from the position held when the vehicle speed is 30 km/h in the direction in which the dimming target 22 is displaced is determined, as shown in FIG. 3F.

In this manner, as, when the vehicle speed is a second vehicle speed higher than a first vehicle speed, the position of the pixel of interest 20a in the structuring element 20 is shifted from the position held when the vehicle speed is the first vehicle speed in the direction in which the dimming target 22 is displaced due to the movement of the vehicle, the dimmed portion 24 can be shifted in the direction in which the dimming target 22 is displaced, in accordance with an increase in the vehicle speed. This configuration can reduce mispositioning of a dimmed portion 24 relative to a dimming target 22 even in a situation in which a change in the relative position of the host vehicle and the dimming target 22 is large.

Herein, FIGS. 3A, 3C, and 3E show the structuring element 20 schematically. Therefore, the number of the pixels extending up and down and right and left from the center pixel of the structuring element 20, for example, is not limited to those illustrated. For example, the structuring element 20 may be linear, extending right and left from the center pixel. The vehicle speeds 0 km/h, 30 km/h, and 80 km/h are examples, and which anchor position to set at which vehicle speed can be set as appropriate. It suffices that the position of an anchor vary at least between two levels, and the position may vary between multiple levels of three or more levels or may vary smoothly.

It suffices that the pattern determining unit 10 execute at least any one of adjusting the dimensions of a structuring element 20 in the up-down and right-left directions in accordance with a vehicle speed, adjusting the dimensions of a structuring element 20 in the right-left directions in accordance with a vehicle speed, or adjusting the position of a pixel of interest 20a in accordance with a vehicle speed. The adjusting of the dimensions of a structuring element 20 and the adjusting of the position of a pixel of interest 20a can be combined.

[Control in Accordance with Rate of Turn]

Figure 4:
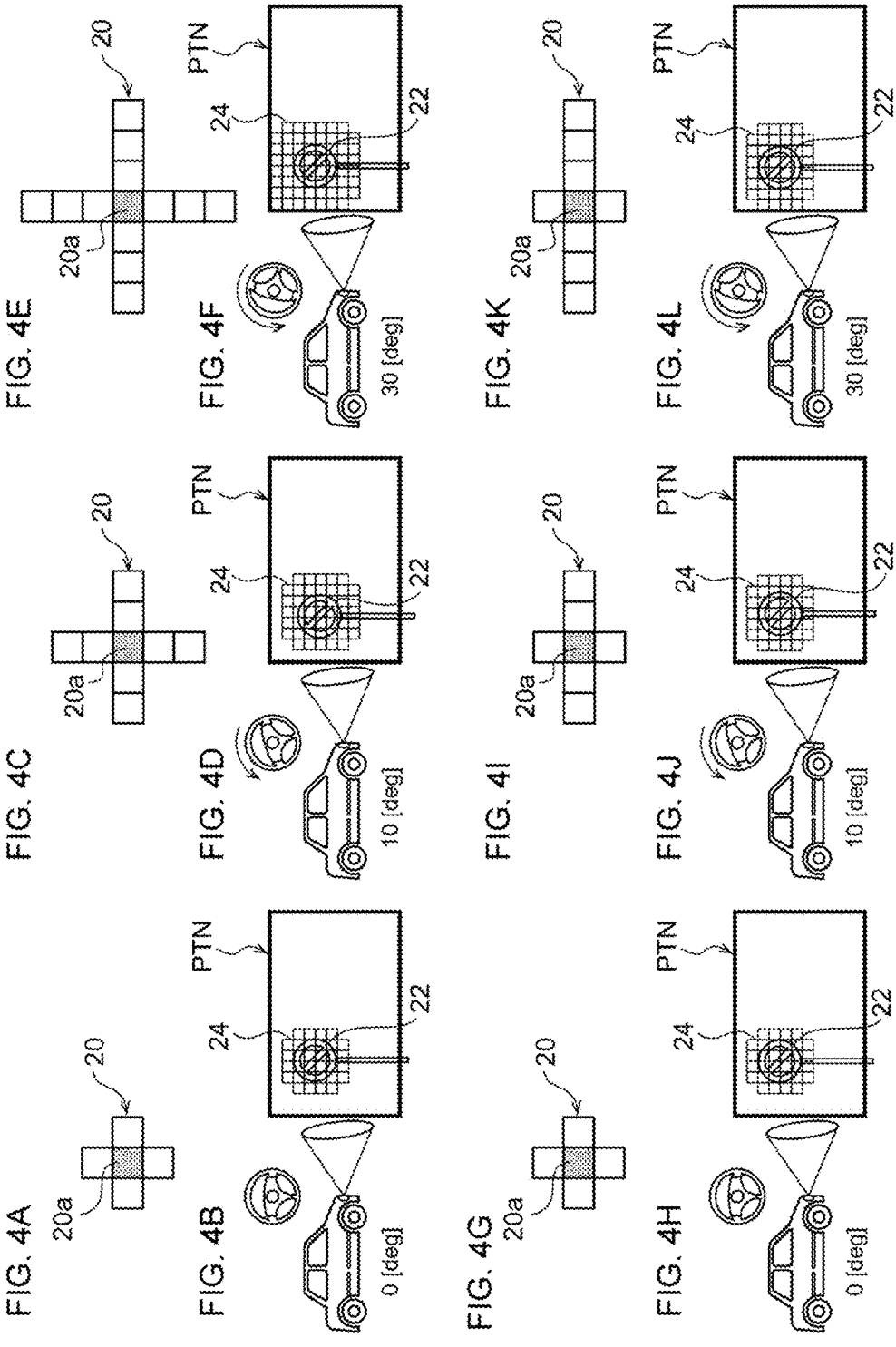
FIGS. 4A to 4L are schematic diagrams for describing control of varying the size of a structuring element in accordance with a rate of turn.

FIGS. 4A to 4L are schematic diagrams for describing control of varying the size of a structuring element in accordance with a rate of turn. In one example of this control, the pattern determining unit 10 stores therein a structuring element 20 of a predetermined shape set in advance as shown in FIG. 4A. The structuring element 20 in one example is cross-shaped and is used, for example, when the steering angle of the host vehicle is 0 degrees, that is, when the rate of turn of the host vehicle is the rate of turn corresponding to the steering angle of 0 degrees. The pattern determining unit 10 performs a dilation process on a luminous point image with the center pixel of the structuring element 20 mapped to a pixel of interest 20a. As a result, a light distribution pattern PTN having a dimmed portion 24 to overlap a dimming target 22 is determined, as shown in FIG. 4B.

When the steering angle is greater than 0 degrees and is, for example, 10 degrees, the pattern determining unit 10 sets the dimensions of the structuring element 20 in the image's up-down and right-left directions to dimensions greater than the dimensions used when the steering angle is 0 degrees, as shown in FIG. 4C. Thus, a light distribution pattern PTN having a dimmed portion 24 that is larger in the up-down and right-left directions than the dimmed portion 24 formed when the steering angle is 0 degrees is determined, as shown in FIG. 4D.

When the steering angle is greater than 10 degrees and is, for example, 30 degrees, the pattern determining unit 10 sets the dimensions of the structuring element 20 in the image's up-down and right-left directions to dimensions greater than the dimensions used when the steering angle is 10 degrees, as shown in FIG. 4E. Thus, a light distribution pattern PTN having a dimmed portion 24 that is larger in the up-down and right-left directions than the dimmed portion 24 formed when the steering angle is 10 degrees is determined, as shown in FIG. 4F.

In this manner, as, when the rate of turn is a second rate of turn higher than a first rate of turn, the dimensions of the structuring element 20 in the image's up-down and right-left directions are set greater than the dimensions in the image's up-down and right-left directions held when the rate of turn is the first rate of turn, the size of a dimmed portion 24 can be increased in the up-down and right-left directions in accordance with an increase in the rate of turn. This configuration can reduce mispositioning of a dimmed portion 24 relative to a dimming target 22 even in a situation in which a change in the relative position of the host vehicle and the dimming target 22 is large.

Herein, FIGS. 4A, 4C, and 4E show the structuring element 20 schematically. Therefore, the number of the pixels extending up and down and right and left from the center pixel of the structuring element 20, for example, is not limited to those illustrated. For example, the structuring element 20 used when the steering angle is 0 degrees may be linear, extending right and left from the center pixel. The steering angles 0 degrees, 10 degrees, and 30 degrees are examples, and a structuring element 20 of which shape to use at which rate of turn can be set as appropriate. It suffices that the size of a structuring element 20 vary at least between two levels, and the size may vary between multiple levels of three or more levels or may vary smoothly.

In another example of control of varying the size of a structuring element in accordance with a rate of turn, the pattern determining unit 10 stores in advance a structuring element 20 having a predetermined shape as shown in FIG. 4G. The structuring element 20 in one example is cross-shaped and is used, for example, when the steering angle of the host vehicle is 0 degrees. The pattern determining unit 10 performs a dilation process on a luminous point image with the center pixel of the structuring element 20, serving as an anchor, mapped to a pixel of interest 20a. As a result, a light distribution pattern PTN having a dimmed portion 24 to overlap a dimming target 22 is determined, as shown in FIG. 4H.

When the steering angle is greater than 0 degrees and is, for example, 10 degrees, the pattern determining unit 10 sets the dimensions of the structuring element 20 in the image's right-left directions to dimensions greater than the dimensions used when the steering angle is 0 degrees, as shown in FIG. 4I. Thus, a light distribution pattern PTN having a dimmed portion 24 that is larger in the right-left directions than the dimmed portion 24 formed when the steering angle is 0 degrees is determined, as shown in FIG. 4J.

When the steering angle is greater than 10 degrees and is, for example, 30 degrees, the pattern determining unit 10 sets the dimensions of the structuring element 20 in the image's right-left directions to dimensions greater than the dimensions used when the steering angle is 10 degrees, as shown in FIG. 4K. Thus, a light distribution pattern PTN having a dimmed portion 24 that is larger in the right-left directions than the dimmed portion 24 formed when the steering angle is 10 degrees is determined, as shown in FIG. 4L.

In this manner, as, when the rate of turn is a second rate of turn higher than a first rate of turn, the dimensions of a structuring element 20 in the image's right-left directions are set greater than the dimensions in the image's right-left directions held when the rate of turn is the first rate of turn, the size of a dimmed portion 24 can be increased in the right-left directions in accordance with an increase in the rate of turn. This configuration can reduce mispositioning of a dimmed portion 24 relative to a dimming target 22 even in a situation in which a change in the relative position of the host vehicle and the dimming target 22 is large.

Herein, FIGS. 4G, 4I, and 4K show the structuring element 20 schematically. Therefore, the number of the pixels extending up and down and right and left from the center pixel of the structuring element 20, for example, is not limited to those illustrated. For example, the structuring element 20 may be linear, extending right and left from the center pixel. The steering angles 0 degrees, 10 degrees, and 30 degrees are examples, and a structuring element 20 of which shape to use at which rate of turn can be set as appropriate. It suffices that the size of a structuring element 20 vary at least between two levels, and the size may vary between multiple levels of three or more levels or may vary smoothly.

Figure 5:
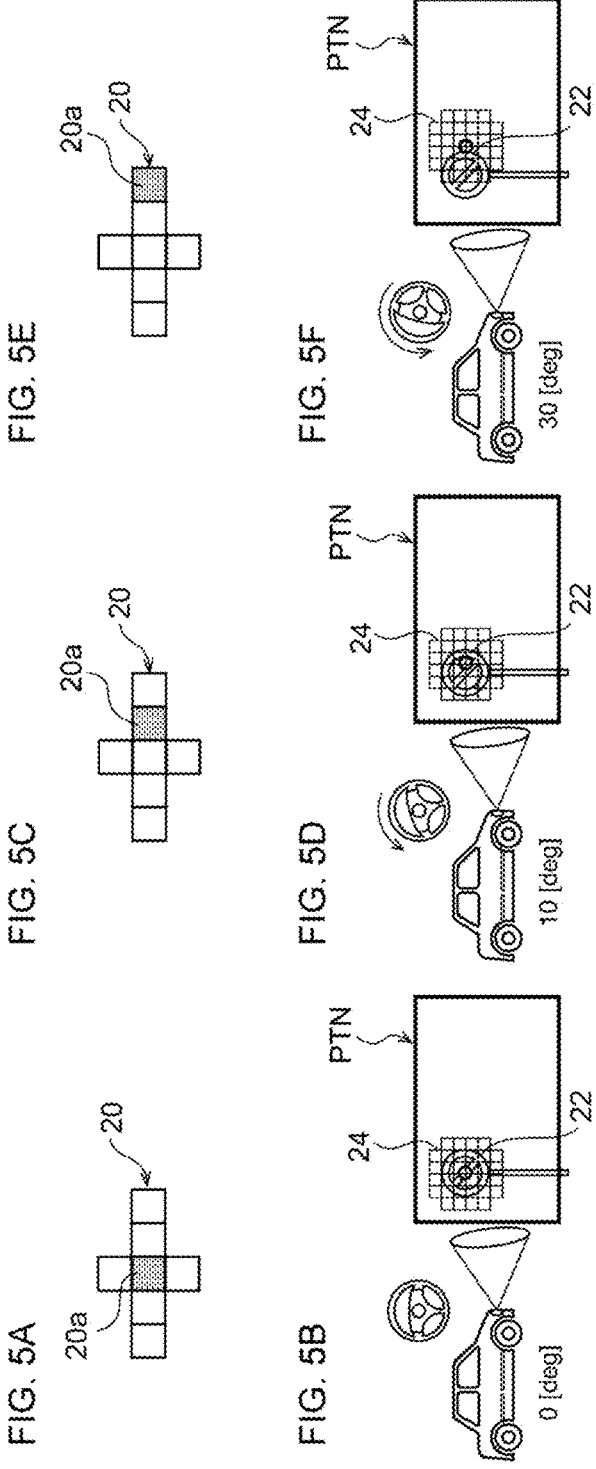
FIGS. 5A to 5F are schematic diagrams for describing control of varying the position of a pixel of interest in a structuring element in accordance with a rate of turn.

FIGS. 5A to 5F are schematic diagrams for describing control of varying the position of a pixel of interest 20a in a structuring element 20 in accordance with a rate of turn. In one example of this control, the pattern determining unit 10 stores therein a structuring element 20 of a predetermined shape set in advance as shown in FIG. 5A. The structuring element 20 in one example is cross-shaped and is used, for example, when the steering angle of the host vehicle is 0 degrees. The pattern determining unit 10 performs a dilation process on a luminous point image with the center pixel of the structuring element 20, serving as an anchor, mapped to a pixel of interest 20a. As a result, a light distribution pattern PTN having a dimmed portion 24 to overlap a dimming target 22 is determined, as shown in FIG. 5B.

When the steering angle is greater than 0 degrees and is, for example, 10 degrees, the pattern determining unit 10 shifts the position of the pixel of interest 20a in the structuring element 20 from the position used when the steering angle is 0 degrees in the direction opposite the direction of turn of the host vehicle (steering direction), as shown in FIG. 5C. A dimming target 22 is displaced in the right direction when the host vehicle turns left or is displaced in the left direction when the host vehicle turns right. When the position of the pixel of interest 20a in a structuring element 20 is shifted, the dilated region becomes dilated in the direction in which the pixel of interest 20a has been shifted. Therefore, the pattern determining unit 10 shifts the pixel of interest 20a in the direction opposite the direction of turn. Thus, a light distribution pattern PTN having a dimmed portion 24 shifted from the position held when the steering angle is 0 degrees in the direction in which the dimming target 22 has been displaced is determined, as shown in FIG. 5D.

When the steering angle is greater than 10 degrees and is, for example, 30 degrees, the pattern determining unit 10 shifts the position of the pixel of interest 20a in the structuring element 20 from the position used when the steering angle is 10 degrees in the direction opposite the direction of turn, as shown in FIG. 5E. Thus, a light distribution pattern PTN having a dimmed portion 24 shifted from the position held when the steering angle is 10 degrees in the direction in which the dimming target 22 is displaced is determined, as shown in FIG. 5F.

In this manner, as, when the rate of turn is a second rate of turn higher than a first rate of turn, the position of the pixel of interest 20a in the structuring element 20 is shifted from the position held when the rate of turn is the first rate of turn in the direction opposite the direction of turn of the vehicle, the dimmed portion 24 can be shifted in the direction in which the dimming target 22 is displaced, in accordance with an increase in the rate of turn. This configuration can reduce mispositioning of a dimmed portion 24 relative to a dimming target 22 even in a situation in which a change in the relative position of the host vehicle and the dimming target 22 is large.

Herein, FIGS. 5A, 5C, and 5E show the structuring element 20 schematically. Therefore, the number of the pixels extending up and down and right and left from the center pixel of the structuring element 20, for example, is not limited to those illustrated. For example, the structuring element 20 may be linear, extending right and left from the center pixel. The steering angles 0 degrees, 10 degrees, and 30 degrees are examples, and which anchor position to set at which rate of turn can be set as appropriate. It suffices that the position of an anchor vary at least between two levels, and the position may vary between multiple levels of three or more levels or may vary smoothly.

It suffices that the pattern determining unit 10 execute at least any one of adjusting the dimensions of a structuring element 20 in the up-down and right-left directions in accordance with a rate of turn, adjusting the dimensions of a structuring element 20 in the right-left directions in accordance with a rate of turn, or adjusting the position of a pixel of interest 20a in accordance with a rate of turn. The adjusting of the dimensions of a structuring element 20 and the adjusting of the position of a pixel of interest 20a can be combined.

Figure 6:
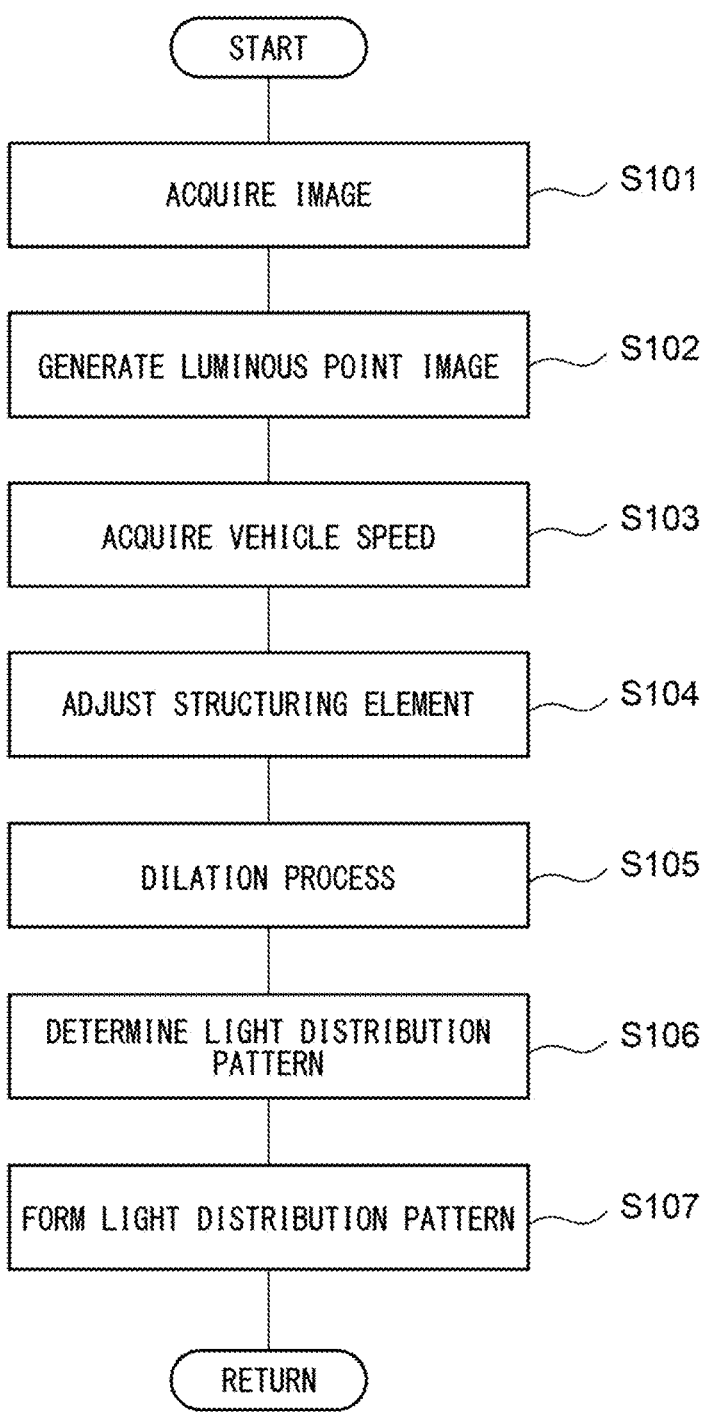
FIG. 6 is a flowchart for describing one example of control that a light distribution controlling device executes.

FIG. 6 is a flowchart for describing one example of control that the light distribution controlling device 6 executes. This flow is executed repeatedly at predetermined timings, for example, when the execution of ADB control is instructed via a light switch (not shown) and when the ignition is on. In the example described below, the structuring element 20 is adjusted in accordance with the vehicle speed.

First, the light distribution controlling device 6 acquires an image IMG from the imaging device 4 (S101). The light distribution controlling device 6 then generates a luminous point image from the image IMG (S102). In addition, the light distribution controlling device 6 acquires the vehicle speed from the vehicle speed sensor 14 (S103). The light distribution controlling device 6 then adjusts the size of the structuring element 20 or the anchor position in accordance with the vehicle speed (S104). Herein, the process of acquiring an image IMG and generating a luminous point image and the process of acquiring the vehicle speed and adjusting the structuring element may be executed in the reverse order or executed simultaneously.

Next, the light distribution controlling device 6 performs a dilation process on the luminous point image by using the adjusted structuring element 20 (S105). Thus, when the luminous point image includes a luminous point, a dimmed portion 24 corresponding to this luminous point is generated. Then, the light distribution controlling device 6 determines a light distribution pattern PTN having the dimmed portion 24 (S106), controls the light distribution variable lamp 2 so as to form the determined light distribution pattern PTN (S107), and terminates this routine.

As described above, the light distribution controlling device 6 according to the present embodiment performs, by using a structuring element 20 of a predetermined shape, a dilation process on a luminous point included in an image IMG to generate a dilated region, and determines a dimmed portion 24 to overlap a dimming target 22 based on the dilated region. Furthermore, the light distribution controlling device 6 varies at least one of the size of the structuring element 20 to use in the dilation process or the position of the pixel of interest 20a in the structuring element 20 in accordance with at least one of the vehicle speed or the rate of turn of the vehicle. This configuration can reduce mispositioning of a dimmed portion 24 relative to a dimming target 22 even in a situation in which the amount of change, per unit time, in the relative position of the host vehicle and the dimming target 22 is large. Accordingly, safety in vehicle driving can be improved.

Furthermore, the light distribution controlling device 6 executes at least any one of: when the vehicle speed is a second vehicle speed higher than a first vehicle speed, setting the dimensions of the structuring element 20 in the image's up-down and right-left directions to dimensions greater than the dimensions in the image's up-down and right-left directions held when the vehicle speed is the first vehicle speed; when the vehicle speed is the second vehicle speed, setting the dimensions of the structuring element 20 in the image's right-left directions to dimensions greater than the dimensions in the image's right-left directions held when the vehicle speed is the first vehicle speed; or when the vehicle speed is the second vehicle speed, shifting the position of the pixel of interest 20a from the position held when the vehicle speed is the first vehicle speed in the direction in which the dimming target 22 is displaced due to the movement of the vehicle.

Furthermore, the light distribution controlling device 6 executes at least any one of: when the rate of turn is a second rate of turn higher than a first rate of turn, setting the dimensions of the structuring element 20 in the image's up-down and right-left directions to dimensions greater than the dimensions in the image's up-down and right-left directions held when the rate of turn is the first rate of turn; when the rate of turn is the second rate of turn, setting the dimensions of the structuring element 20 in the image's right-left directions to dimensions greater than the dimensions in the image's right-left directions held when the rate of turn is the first rate of turn; or when the rate of turn is the second rate of turn, shifting the position of the pixel of interest 20a from the position held when the rate of turn is the first rate of turn in the direction opposite the direction of turn of the vehicle.

Herein, only one of or both of the adjusting of a structuring element 20 in accordance with the vehicle speed and the adjusting of a structuring element 20 in accordance with the rate of turn may be performed. In this case, which of the adjusting in accordance with the vehicle speed and the adjusting in accordance with the rate of turn is given a priority can be set as appropriate.

When a structuring element 20 is enlarged in the up-down and right-left directions, a dimmed portion 24 can be expanded in the up-down and right-left directions. In this case, mispositioning of the dimmed portion 24 relative to the dimming target 22 can be reduced more easily. Meanwhile, when a structuring element 20 is enlarged only in the right-left directions, a dimmed portion 24 can be expanded only in the right-left directions. In this case, the dimmed portion 24 can be kept small as it is not expanded in the up-down direction. This configuration can lower the degree by which the expansion of a dimmed portion 24 reduces the visibility for the driver of the host vehicle. Furthermore, the configuration above can shorten the time needed for the process of determining a light distribution pattern PTN. A change in the relative position of the host vehicle and a dimming target 22 is smaller in the up-down direction than in the right-left direction. Therefore, limiting the direction of expanding a dimmed portion 24 not to the right-left direction but to the up-down direction can reduce the likelihood that the dimmed portion 24 becomes mispositioned relative to the dimming target 22 due to the limiting of the range of expanding the dimmed portion 24.

When the position of the pixel of interest 20a in a structuring element 20 is shifted, the position of a dimmed portion 24 can be shifted in the direction in which the dimming target 22 is displaced. In this case, as compared to the case in which the size of a structuring element 20 is changed, a dimmed portion 24 having a shape conforming to the shape of the dimming target 22 can be formed. This configuration can thus lower the likelihood that the expansion of a dimmed portion 24 reduces the visibility for the driver of the host vehicle. Furthermore, the configuration above can shorten the time needed for the process of determining a light distribution pattern PTN.

Thus far, some embodiments according to the present invention have been described in detail. The embodiments described above merely illustrate some specific examples for implementing the present invention. The contents of the embodiments do not limit the technical scope of the present invention, and a number of design changes, including modifications, additions, and deletions of constituent elements, can be made within the scope that does not depart from the sprit of the invention set forth in the claims. A new embodiment resulting from adding a design change has advantageous effects of the embodiments combined as well as the advantageous effects of the modification. With regard to the embodiments described above, the expressions "according to the present embodiment," "in the present embodiment," and so on are added for emphasis to the contents that can be subjected to such a design change described above, but a design change is also permitted on the contents without these expressions. A desired combination of the constituent elements described above is also valid as an aspect of the present invention. Hatching added across a section in the drawings does not limit the material of such with hatching.

The invention according to the embodiments described above may be identified by the items indicated below.

[First Item]

A light distribution controlling device (6) that determines a light distribution pattern (PTN) having a dimmed portion (24) to overlap a dimming target (22) present in a region ahead of a vehicle, the light distribution controlling device (6) configured to:

perform, by using a structuring element (20) of a predetermined shape, a dilation process on a luminous point included in an image (IMG) capturing the region ahead to generate a dilated region, and determine the dimmed portion (24) based on the dilated region; and vary at least one of a size of the structuring element (20) or a position of a pixel of interest (20a) in the structuring element (20) in accordance with at least one of a vehicle speed or a rate of turn of the vehicle.

[Second Item]

The light distribution controlling device (6) according to First Item, wherein the light distribution controlling device (6) executes at least any one of:

when the vehicle speed is a second vehicle speed higher than a first vehicle speed, setting dimensions of the structuring element (20) in the image's up-down and right-left directions to dimensions greater than dimensions in the image's up-down and right-left directions held when the vehicle speed is the first vehicle speed;

when the vehicle speed is the second vehicle speed, setting dimensions of the structuring element (20) in the image's right-left direction to dimensions greater than dimensions in the image's right-left direction held when the vehicle speed is the first vehicle speed; or when the vehicle speed is the second vehicle speed, shifting the position of the pixel of interest (20a) in the structuring element (20) from a position held when the vehicle speed is the first vehicle speed in a direction in which the dimming target (22) becomes displaced due to a movement of the vehicle.

[Third Item]

The light distribution controlling device (6) according to First Item or Second Item, wherein the light distribution controlling device (6) executes at least any one of:

when the rate of turn is a second rate of turn higher than a first rate of turn, setting dimensions of the structuring element (20) in the image's up-down and right-left directions to dimensions greater than dimensions in the image's up-down and right-left directions held when the rate of turn is the first rate of turn;

when the rate of turn is the second rate of turn, setting dimensions of the structuring element (20) in the image's right-left direction to dimensions greater than dimension in the image's right-left direction held when the rate of turn is the first rate of turn; or when the rate of turn is the second rate of turn, shifting the position of the pixel of interest (20a) in the structuring element (20) from a position held when the rate of turn is the first rate of turn in a direction opposite a direction of turn of the vehicle.

[Fourth Item]

The light distribution controlling device (6) according to any one of First Item to Third Item, wherein the light distribution controlling device (6) acquires the rate of turn based on a detection value of a steering angle sensor (16) provided in the vehicle.

[Fifth Item]

A vehicle lamp system (1), comprising:

a light distribution variable lamp (2) capable of illuminating a region ahead of a vehicle with a visible light beam (L1) of a variable intensity distribution;

an imaging device (4) that captures an image of the region ahead; and the light distribution controlling device (6) according to any one of First Item to Fourth Item that determines a light distribution pattern (PTN) based on an image (IMG) captured by the imaging device (4) and controls the light distribution variable lamp (2) so as to form the light distribution pattern (PTN).

[Sixth Item]

A light distribution controlling method of determining a light distribution pattern (PTN) having a dimmed portion (24) to overlap a dimming target (22) present in a region ahead of a vehicle, the light distribution controlling method comprising:

performing, by using a structuring element (20) of a predetermined shape, a dilation process on a luminous point included in an image (IMG) capturing the region ahead to generate a dilated region, and determining the dimmed portion (24) based on the dilated region; and varying at least one of a size of the structuring element (20) or a position of a pixel of interest (20a) in the structuring element (20) in accordance with at least one of a vehicle speed or a rate of turn of the vehicle.

What is claimed is:

1. A light distribution controlling device that determines a light distribution pattern having a dimmed portion to overlap a dimming target present in a region ahead of a vehicle, the light distribution controlling device configured to:

perform, by using a structuring element of a predetermined shape, a dilation process on a luminous point included in an image capturing the region ahead to generate a dilated region, and determine the dimmed portion based on the dilated region; and vary at least one of a size of the structuring element or a position of a pixel of interest in the structuring element in accordance with at least one of a vehicle speed or a rate of turn of the vehicle.

2. The light distribution controlling device according to claim 1, wherein the light distribution controlling device executes at least any one of:

when the vehicle speed is a second vehicle speed higher than a first vehicle speed, setting dimensions of the structuring element in the image's up-down and right-left directions to dimensions greater than dimensions in the image's up-down and right-left directions held when the vehicle speed is the first vehicle speed;

when the vehicle speed is the second vehicle speed, setting dimensions of the structuring element in the image's right-left direction to dimensions greater than dimensions in the image's right-left direction held when the vehicle speed is the first vehicle speed; or when the vehicle speed is the second vehicle speed, shifting the position of the pixel of interest in the structuring element from a position held when the vehicle speed is the first vehicle speed in a direction in which the dimming target becomes displaced due to a movement of the vehicle.

3. The light distribution controlling device according to claim 1, wherein the light distribution controlling device executes at least any one of:

when the rate of turn is a second rate of turn higher than a first rate of turn, setting dimensions of the structuring element in the image's up-down and right-left directions to dimensions greater than dimensions in the image's up-down and right-left directions held when the rate of turn is the first rate of turn;

when the rate of turn is the second rate of turn, setting dimensions of the structuring element in the image's right-left direction to dimensions greater than dimension in the image's right-left direction held when the rate of turn is the first rate of turn; or when the rate of turn is the second rate of turn, shifting the position of the pixel of interest in the structuring element from a position held when the rate of turn is the first rate of turn in a direction opposite a direction of turn of the vehicle.

4. The light distribution controlling device according to claim 2, wherein the light distribution controlling device executes at least any one of:

when the rate of turn is a second rate of turn higher than a first rate of turn, setting dimensions of the structuring element in the image's up-down and right-left directions to dimensions greater than dimensions in the image's up-down and right-left directions held when the rate of turn is the first rate of turn;

when the rate of turn is the second rate of turn, setting dimensions of the structuring element in the image's right-left direction to dimensions greater than dimension in the image's right-left direction held when the rate of turn is the first rate of turn; or when the rate of turn is the second rate of turn, shifting the position of the pixel of interest in the structuring element from a position held when the rate of turn is the first rate of turn in a direction opposite a direction of turn of the vehicle.

5. The light distribution controlling device according to claim 1, wherein the light distribution controlling device acquires the rate of turn based on a detection value of a steering angle sensor provided in the vehicle.

6. The light distribution controlling device according to claim 2, wherein the light distribution controlling device acquires the rate of turn based on a detection value of a steering angle sensor provided in the vehicle.

7. The light distribution controlling device according to claim 3, wherein the light distribution controlling device acquires the rate of turn based on a detection value of a steering angle sensor provided in the vehicle.

8. The light distribution controlling device according to claim 4, wherein the light distribution controlling device acquires the rate of turn based on a detection value of a steering angle sensor provided in the vehicle.

9. A vehicle lamp system, comprising:

a light distribution variable lamp capable of illuminating a region ahead of a vehicle with a visible light beam of a variable intensity distribution;

an imaging device that captures an image of the region ahead; and the light distribution controlling device according to claim 1 that determines a light distribution pattern based on the image captured by the imaging device and controls the light distribution variable lamp so as to form the light distribution pattern.

10. A light distribution controlling method of determining a light distribution pattern having a dimmed portion to overlap a dimming target present in a region ahead of a vehicle, the light distribution controlling method comprising:

performing, by using a structuring element of a predetermined shape, a dilation process on a luminous point included in an image capturing the region ahead to generate a dilated region, and determining the dimmed portion based on the dilated region; and varying at least one of a size of the structuring element or a position of a pixel of interest in the structuring element in accordance with at least one of a vehicle speed or a rate of turn of the vehicle.

* * * * *